(12) United States Patent
Sharp et al.

(10) Patent No.: US 7,313,389 B1
(45) Date of Patent: Dec. 25, 2007

(54) PORTABLE TELECOMMUNICATION DEVICE

(75) Inventors: Jonathan Sharp, Sunningdale Berks (GB); Daren Leith, Christmas Cottage (GB)

(73) Assignee: Nokia Corporation (FI)

( * ) Notice: Subject to any disclaimer, the term of this patent is extended or adjusted under 35 U.S.C. 154(b) by 968 days.

(21) Appl. No.: 10/110,057

(22) PCT Filed: Sep. 25, 2000

(86) PCT No.: PCT/EP00/09336

§ 371 (c)(1), (2), (4) Date: Jul. 17, 2002

(87) PCT Pub. No.: WO01/28203

PCT Pub. Date: Apr. 19, 2001

(30) Foreign Application Priority Data

Oct. 8, 1999 (GB) ................................. 9923924.6

(51) Int. Cl.
*H04M 3/00* (2006.01)
(52) U.S. Cl. .................................................... 455/418
(58) Field of Classification Search ................. 455/418
See application file for complete search history.

(56) References Cited

U.S. PATENT DOCUMENTS

| 5,436,625 A | 7/1995 | Kubo |
| 5,642,413 A | 6/1997 | Little .......................... 379/373 |
| 5,966,671 A * | 10/1999 | Mitchell et al. .......... 455/550.1 |
| 6,374,091 B1 * | 4/2002 | Richards et al. ........... 455/90.1 |
| 6,519,475 B1 | 2/2003 | Kim |
| 6,600,930 B1 | 7/2003 | Sakurai et al. |
| 2003/0008679 A1 | 1/2003 | Iwata et al. |

FOREIGN PATENT DOCUMENTS

| EP | 0 604 069 | 6/1994 |
| EP | 0 803 849 A1 | 10/1997 |
| GB | 2 275 587 | 8/1994 |
| GB | 2 307 367 | 5/1997 |
| GB | 2307367 A | 5/1997 |
| GB | 2317531 A | 3/1998 |
| GB | 2 326 051 | 12/1998 |
| GB | 233205 A | 7/1999 |
| GB | 2 344 261 | 5/2000 |
| WO | WO 94/13088 | 6/1994 |
| WO | WO 97/31469 | 8/1997 |
| WO | 99/23800 | 5/1999 |
| WO | WO 99/37077 | 7/1999 |
| WO | WO 99/46911 | 9/1999 |

OTHER PUBLICATIONS

"900 series: Users' guide", Motorola, Online, May 6, 1998.
International Search Report.
European Search Report.

* cited by examiner

*Primary Examiner*—Curtis Kuntz
*Assistant Examiner*—Alexander Jamal
(74) *Attorney, Agent, or Firm*—Alston & Bird LLP

(57) ABSTRACT

A portable device which includes a body, a cover and a key. The cover has a closed position for at least partially covering the body, and the key is accessible when the cover is in this position. The functionality of the key changes depending upon the state of the device. One such function is the muting of an audible indicator provided by a speaker or the like of the device. This may occur, for example, if the key is actuated when the device is a phone and has received an incoming call or if it has an alarm.

48 Claims, 17 Drawing Sheets

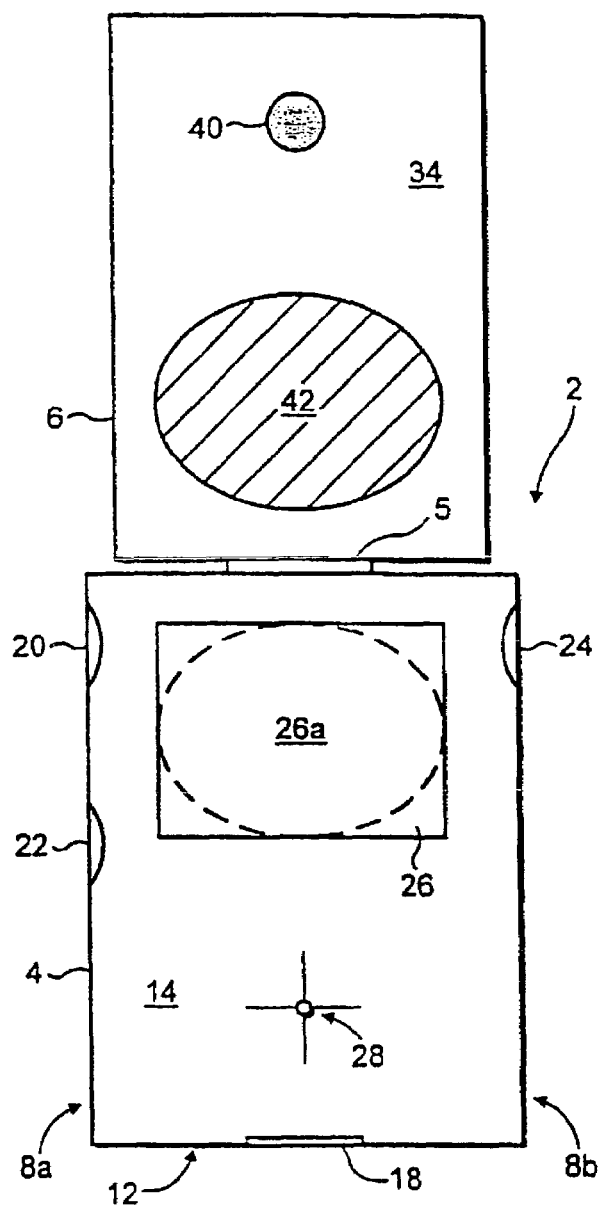
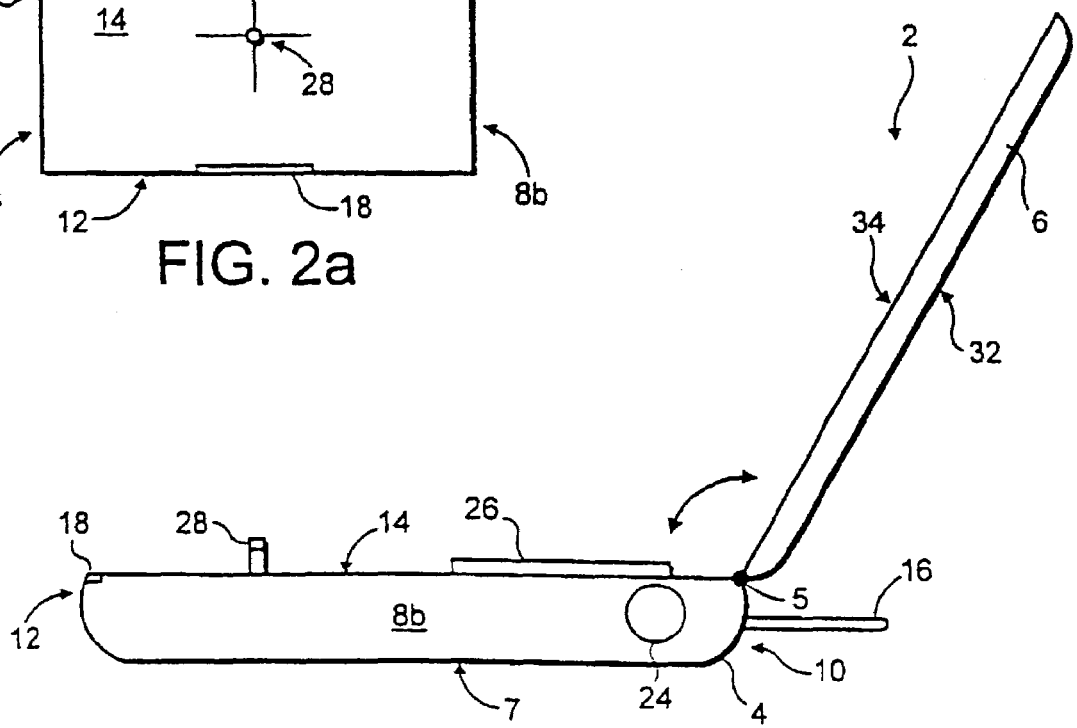
FIG. 2a
FIG. 2b

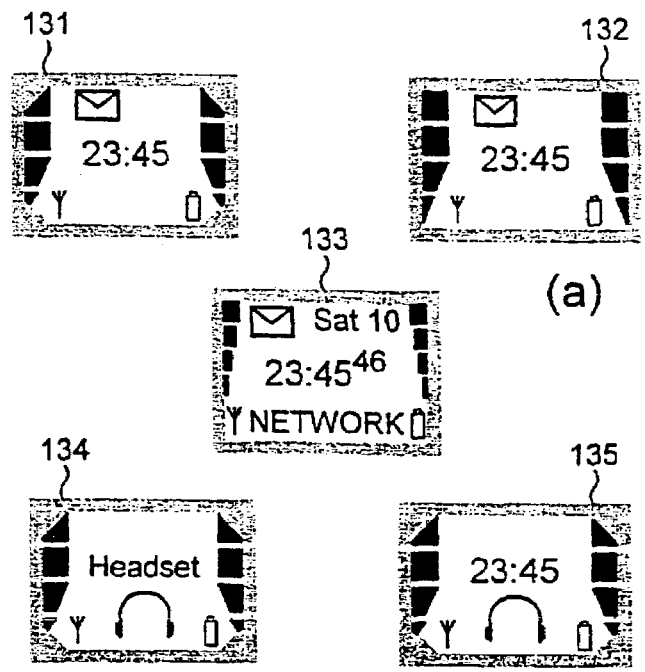
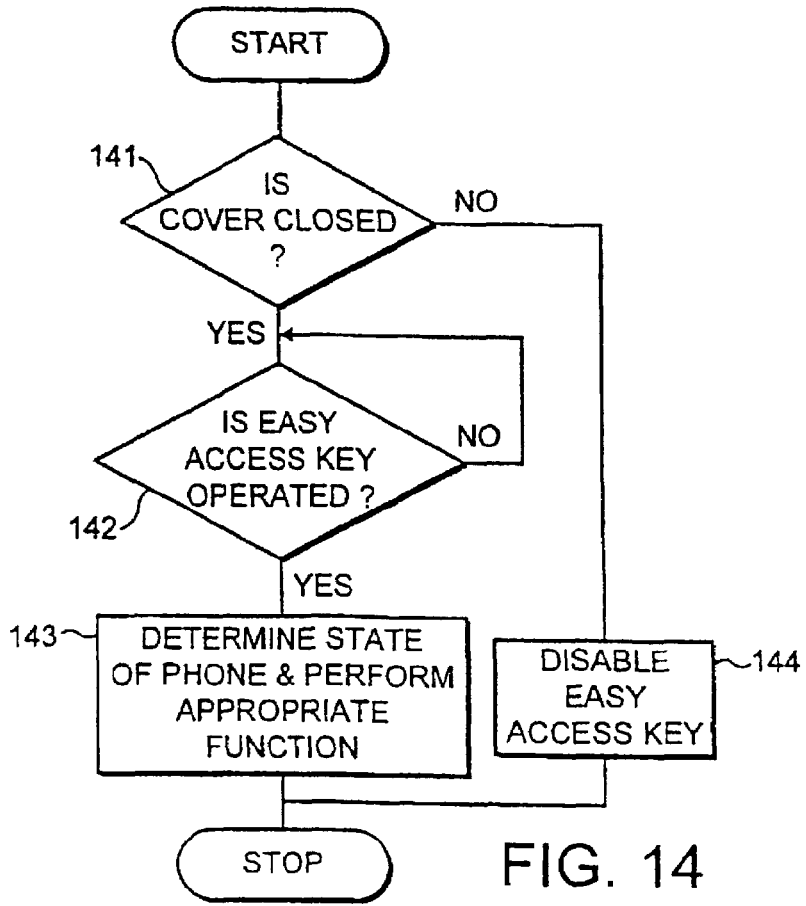
FIG. 13
FIG. 14

PORTABLE TELECOMMUNICATION DEVICE

The present invention relates to a portable device. In particular, it relates to the user interface of a portable device, such as a radio communications device.

There is currently a trend to strive towards the miniaturisation and wearability of portable devices. Particularly where phones are concerned, this results in a trade off against the ergonomics and ease of use of a conventional handset. One option is to compromise on the functionality of the device. However, another is to develop a new user interface that still supports typical features, such as phone calls, messaging and paging in an easily accessible way.

According to the present invention, there is provided a portable device comprising a body; a cover having a closed position for at least partially covering the body and an open position; an audible indicator; and a multifunctional key accessible when the cover is in the closed position. The function of the multifunctional key is dependent upon the state of the device, and for at least one state of the device, operation of the key mutes the audible indicator.

The device has a key that is readily accessible to the user when the cover of the device is closed. For example, even if the user is wearing the device under a sleeve (e.g. a wrist device) or in a pocket, he can actuate this key to perform at least basic functions without looking at the device. The key may be the only one on an accessible surface of the device when the cover is closed. The function of this key is dependent upon the state of the device when the key is actuated, and thus performs a convenient, and maybe even expected, function. One of the functions is the muting of audible indicators, examples of which are given below.

The portable device may comprise a transmitter and/or receiver.

The audible indicator can be used for a variety of purposes. For example, it can be used to indicate an alarm and/or an incoming call to the user. When the device is in a state corresponding to an alarm call, operation of the key mutes the alarm. Similarly, when the device is in a state corresponding to an incoming call, operation of the key mutes the incoming call ringing tone.

As well as the muting function or functions, the key may have one or more further functions. Another function is a display content control function. In this case, the information presented on a display of the device is dependent upon the state of the device. For example, when the device receives a message, operation of the key causes the message to be displayed. Other examples include actuation the key to present missed call information (e.g. the caller's details) when a call has been missed, to present the last number dialled when the phone is in an idle state and/or when a headset is coupled to the device.

In one embodiment, the device further comprises a display having a portion which is visible when the cover is in the closed position, and operation of the key controls the provision of information on the portion of the display visible when the cover is in the closed position Operation of the key is a single actuation, as this is intuitive for the user—he does not have to remember different actuation methods for different functions.

The key may be a button, but this is not essential. Alternatively, it may, for example, be a particular position of a multipositional device, such as a rocker, roller or joystick.

Furthermore, the key may function either dependently or independently of the position of the cover. If dependent upon the position of the cover, the key may be active when the cover is closed and inactive when the cover is open.

For a better understanding of the present invention and to understand how the same may be brought into effect reference will now be made by way of example to the enclosed drawings in which:

FIG. 2a is a front perspective view of the phone in an open configuration;

FIG. 2b is a side perspective view of the phone in an open configuration;

FIG. 13 illustrates various idle screens;

FIGS. 14 and 15 illustrate the functionality of an easy access button; and

Figure 1A:
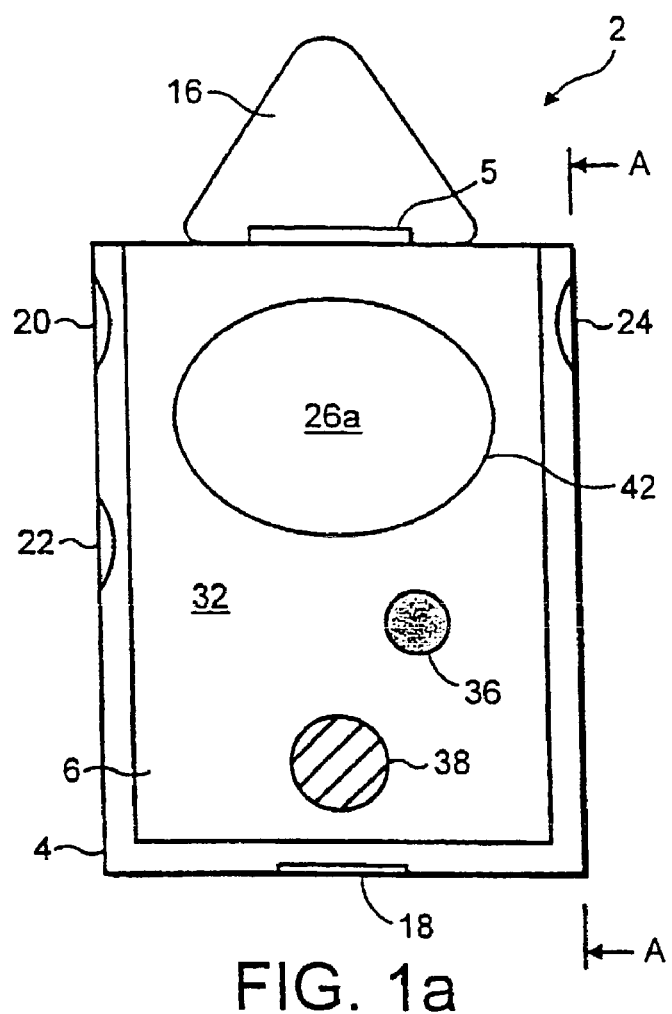
FIG. 1a is a front perspective view of a phone in a closed configuration.
Figure 1B:
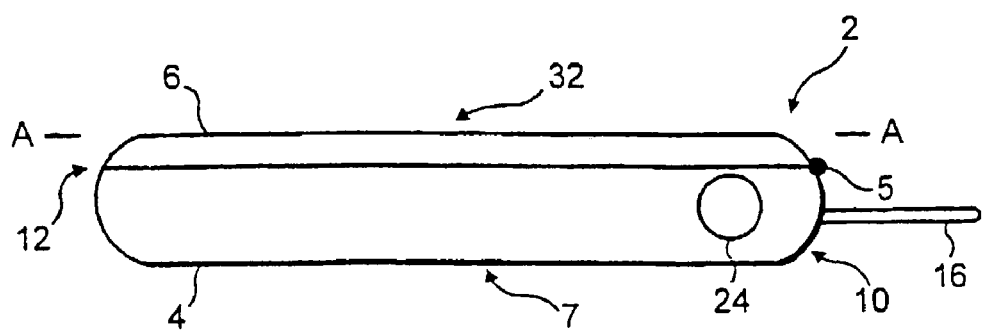
FIG. 1b is a side perspective view of the phone in a closed configuration.
Figure 18A:
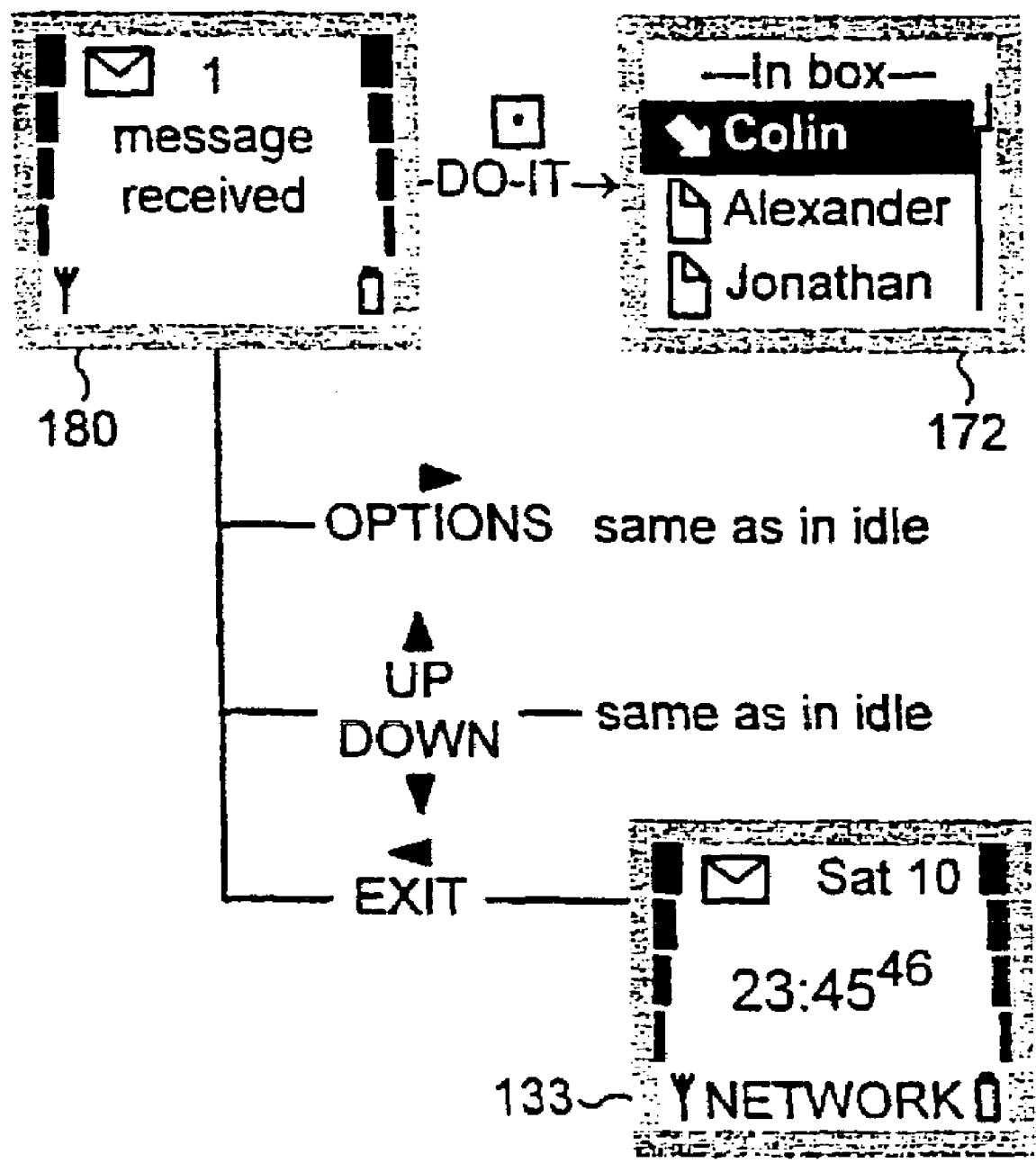
FIG. 18a illustrates how a message may be read when received with the cover open.
Figure 18B:
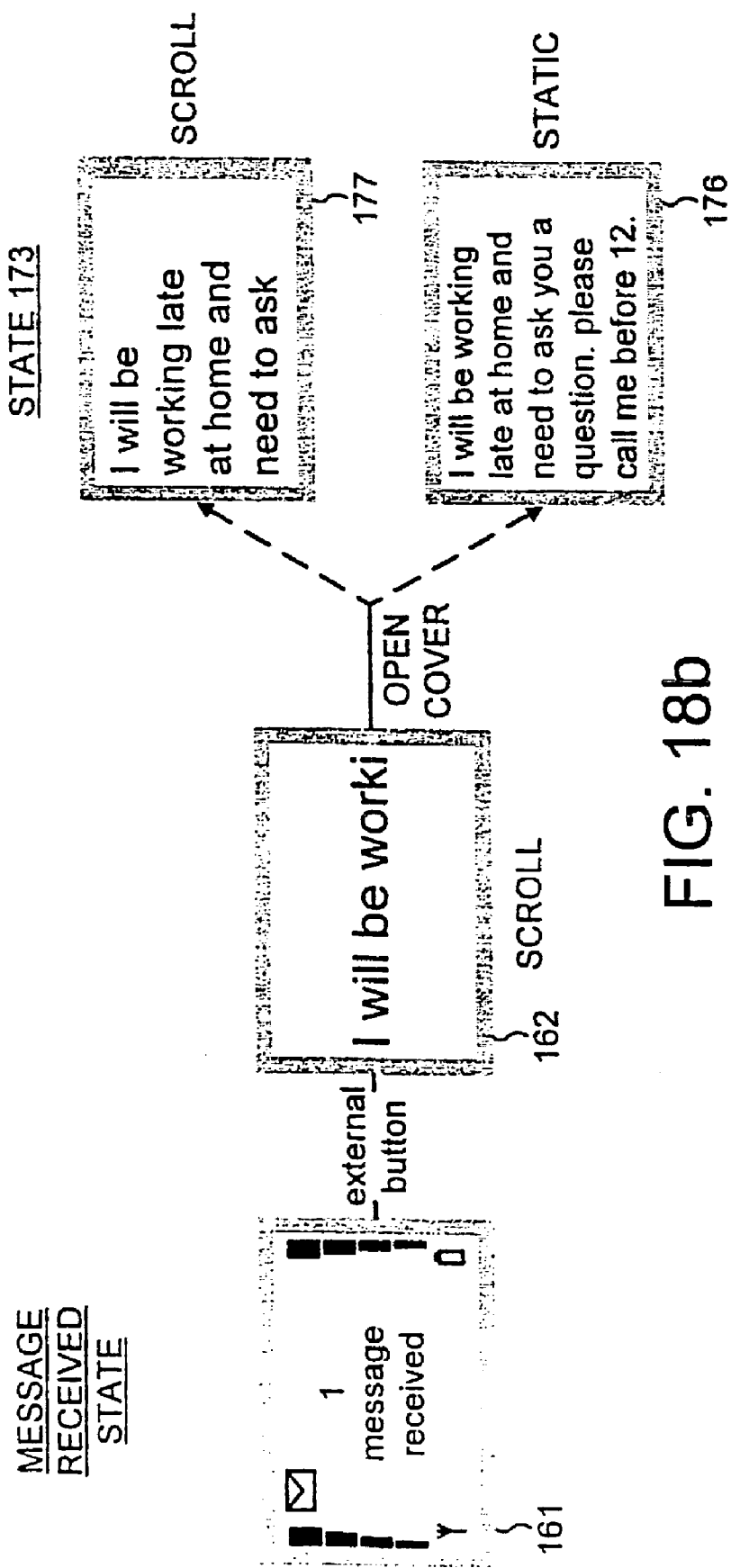
FIG. 18b illustrates how a message may be read when received with the cover closed using the easy access key and then optionally opening the cover.
Figure 18C:
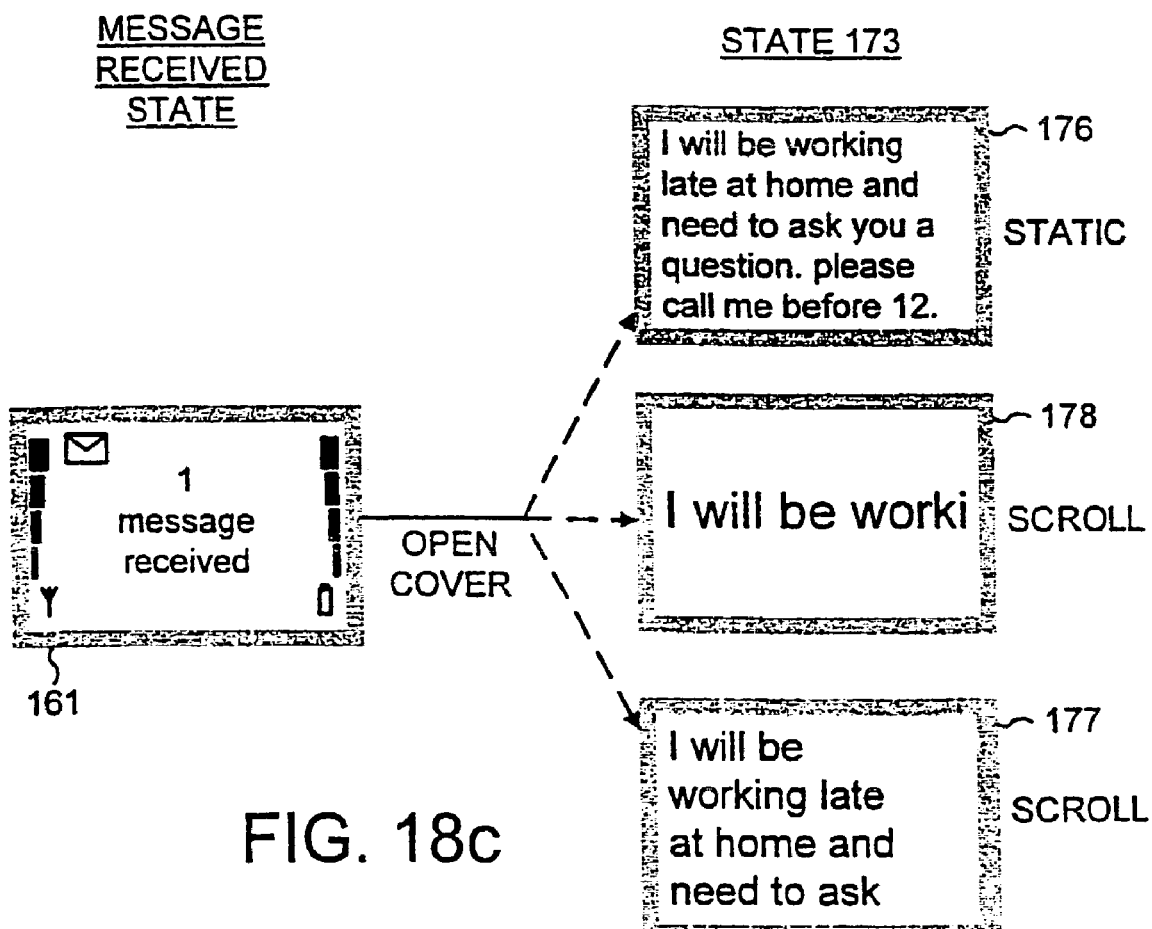

FIG. 18c illustrates how a message may be read when received with the cover closed without using the easy access button but by opening the cover FIGS. 1 and 2 illustrate a phone 2. The phone has a body portion 4 and a cover portion 6 connected by a hinge 5. The cover is movable between a closed position as illustrated in FIGS. 1a (front perspective) and 1b (side perspective) and an open position as illustrated in FIGS. 2a (front perspective) and 2b (side perspective).

The body portion 4 includes a back face 7 which forms the back of the phone, lateral side faces 8a and 8b which form the sides of the phone, an upper side face 10 which forms the top side of the phone, a lower side face 12 which forms the bottom side of the phone, and a front face 14 which is exposed when the cover is in the open position and concealed when the cover is in the closed position. The body has: an antenna 16 on its upper side face 10; a microphone 18 on its lower side face 12; an open-cover button 20, a voice dial button 22, and an on/off button 24 on its side faces 8; and has a display 26 and a user input device 28 which is preferably a joystick on its front face 14. The buttons are user actuatable. The body also has a hinge switch 30 (not shown) which detects the position of the cover, being actuated when the cover opens and closes.

The cover portion 6 has an exterior surface 32 which is accessible when the cover is in the closed position and an interior surface 34 which is inaccessible when the cover is in the closed position but is exposed when the cover is in the open position. The cover portion has on its exterior surface 32 an easily accessible button 36 and a speaker 38. The cover portion has on its interior surface 34 a speaker 40. The cover also has an aperture 42 extending all the way through the cover. The aperture is positioned and sized so that when the cover is in the closed position only a first portion 26a of the display 26 is visible through the aperture 42 to the user. The aperture may be covered with a transparent material to allow the user to see the first portion of the display 26a.

When the cover is in the closed position the interior surface 34 of the cover abuts with the front face 14 of the body 4. The cover is arranged and sized to enclose the input device 28 and display 26 to prevent access by the user. A portion 26a of the display 26 may, however, be viewed by a user through the aperture 36.

When the cover is in the open position the front face 14 of the body and the interior surface 34 of the cover 6 form an oblique angle of between 135 and 175 degrees. In this configuration the whole of the display 26 is exposed, the user input device 28 is exposed and the microphone 18 on the lower side face 12 of the body 4 and the speaker 40 on the interior surface 34 of the cover 6 are at their maximal separation.

The dimensions of the phone in this example are: length, width depth. The display is 2.1×1.4 cm (84×48 pixels).

Figure 3:
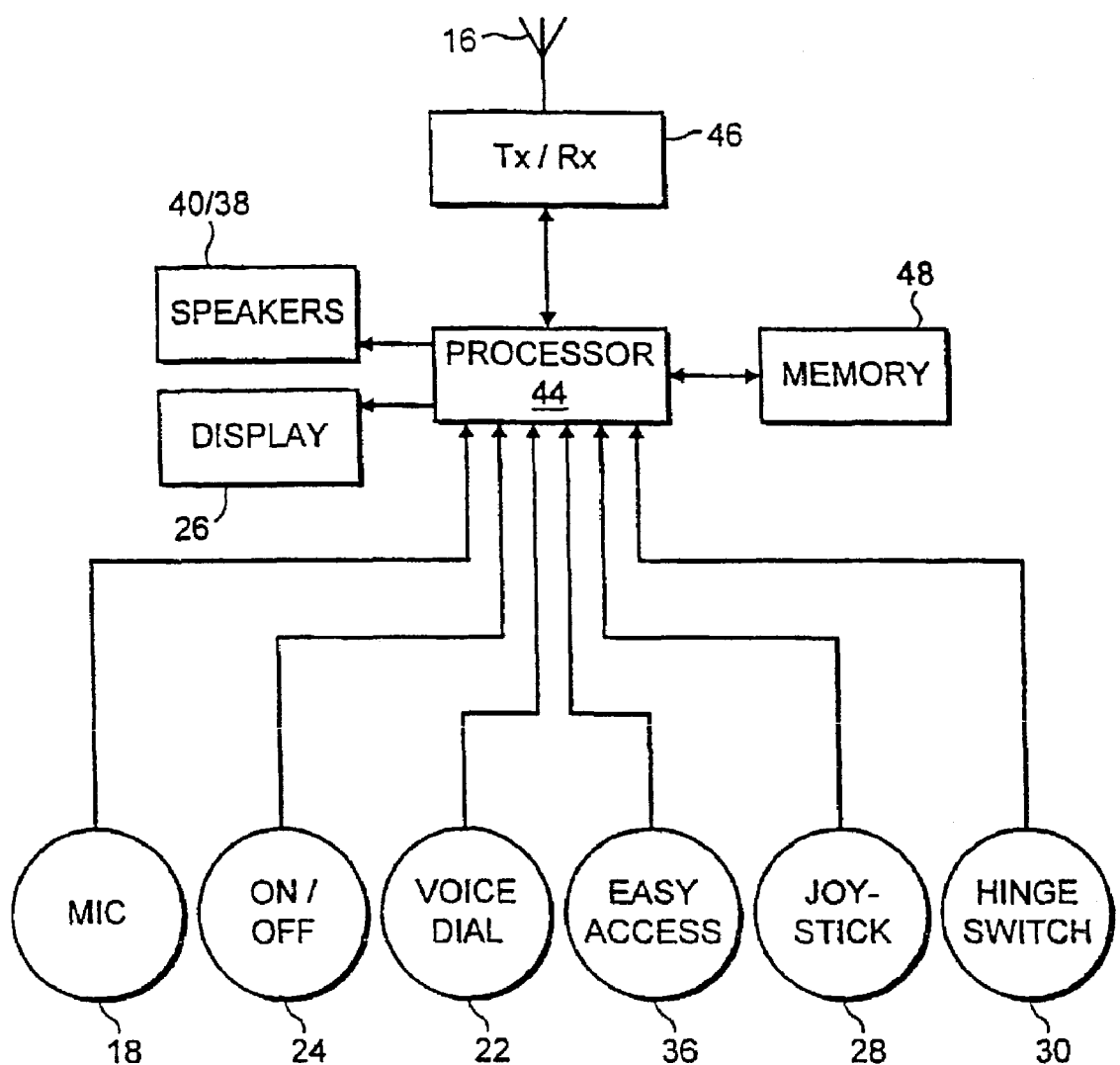
FIG. 3 is a schematic illustration of the phone.

FIG. 3 is a schematic illustration of the phone 2. The phone 2 has the previously described antenna 16, voice dial button 22, on/off button 24, input device (joystick) 28, hinge switch 30, easily accessible button 36, microphone 18, display 26, speakers 40 and 38. In addition the phone has a processor 44, a transceiver 46 and a memory 48. The antenna 16 is connected to the transceiver 46. The transceiver has reception circuitry for receiving radio frequency signals encoded with data. It processes the received signals as is known in the art to provide the data in digital form to the processor 50. This data may be a voice message or part of a phone conversation in which case the processor controls the speaker 40 to provide an audible output to the user. Alternatively the data may be part of an alphanumeric message in which case the processor 44 is operable to provide the message on the display. The transceiver has transmission circuitry which is provided with digital data from the processor 44 which may have been input via the microphone 18 or via the input device 28 as alphanumeric characters. The transmission circuitry produces radio frequency signals encoded with that data. The processor is connected to memory 48 to which it can write and from which it can read. The memory 48 typically stores software which controls the functioning of the processor and the phone. In particular the software controls how the processor responds to inputs and what outputs it provides.

The processor is connected to the display 26 and to the speakers 40 and 38. It controls the output provided by these devices.

The processor is arranged to receive an input from the microphone 18, the input device (joystick) 28, the hinge switch 30, the on/off button 24, the voice dial button 22 and the easily accessible button 36.

The open cover button 20 is not illustrated in FIG. 3 as it opens the cover by mechanical as opposed to electrical action. The natural or low energy configuration for the phone is when the cover is open. The cover is biased to be in the open position. When a user closes the cover they rotate the cover on its hinge against that bias and bring the cover and body into contact. The cover is latched in this closed position. Activating the open cover button releases the latch and the cover springs open.

The antenna 16, transceiver 46, processor 44, memory 48, display 26, speaker and microphone 18 are standard features of a phone. Previously such features have operated in combination with a keypad to provide the standard functions of a phone including making a call either via a phone book or by direct character entry, receiving a call, creating and sending a message, reading a received message and maintaining a phonebook. However, in the phone 2, the features operate in combination with the joystick 28 to provide these standard functions.

Previously in the NOKIA 6110 telephone the keypad had 12 alphanumeric keys, two soft keys whose function changes and a scroll key. The functions of that phone are accessed through a Menu which is navigated using the soft keys and the scroll key. In the phone 2, the functions of the phone are accessed through a Menu which is navigated using the joystick 28.

Figure 4:
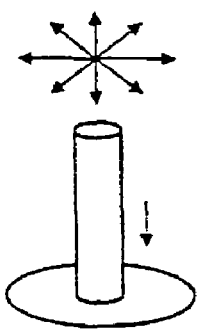
FIG. 4 is an illustration of the joystick of the phone.

FIG. 4 illustrates the joystick 28 which can be moved with a user's thumb. The joystick can be pushed forward (towards the display) while simultaneously pushed to the left or right, pushed to the left or right while simultaneously pushed up or pulled back (towards the microphone), and pulled back while simultaneously being pulled left or right. In addition to each of the above movements the joystick may be simultaneously pushed inwards towards the face 14. The joystick 28 has a resting position and it is resiliently biased so that it returns to its resting position when the user has moved it or depressed it and then released it.

The joystick operates in two different modes. The joystick operates by default in "navigation" mode except when it is in "text editing" mode. In navigation mode there are five independent mutually exclusive activation states for the joystick.

When the joystick is pushed up, the processor performs an upward scrolling function within the current level of the Menu and updates the display accordingly. When the joystick is pulled back, the processor performs a downward scrolling function within the current level of the Menu and updates the display accordingly. These scrolling functions are the same as those scrolling functions in the NOKIA 6110. When the joystick is pushed to the left, the processor exits to the previous higher level in the Menu. When the joystick is pushed to the right, the processor presents on the display the options available to the user but in the Idle Mode it brings up the Menu. When the joystick is pushed inwards the processor enters the next level of the Menu or if there are no further levels it will display the options available to the user.

Figure 5:
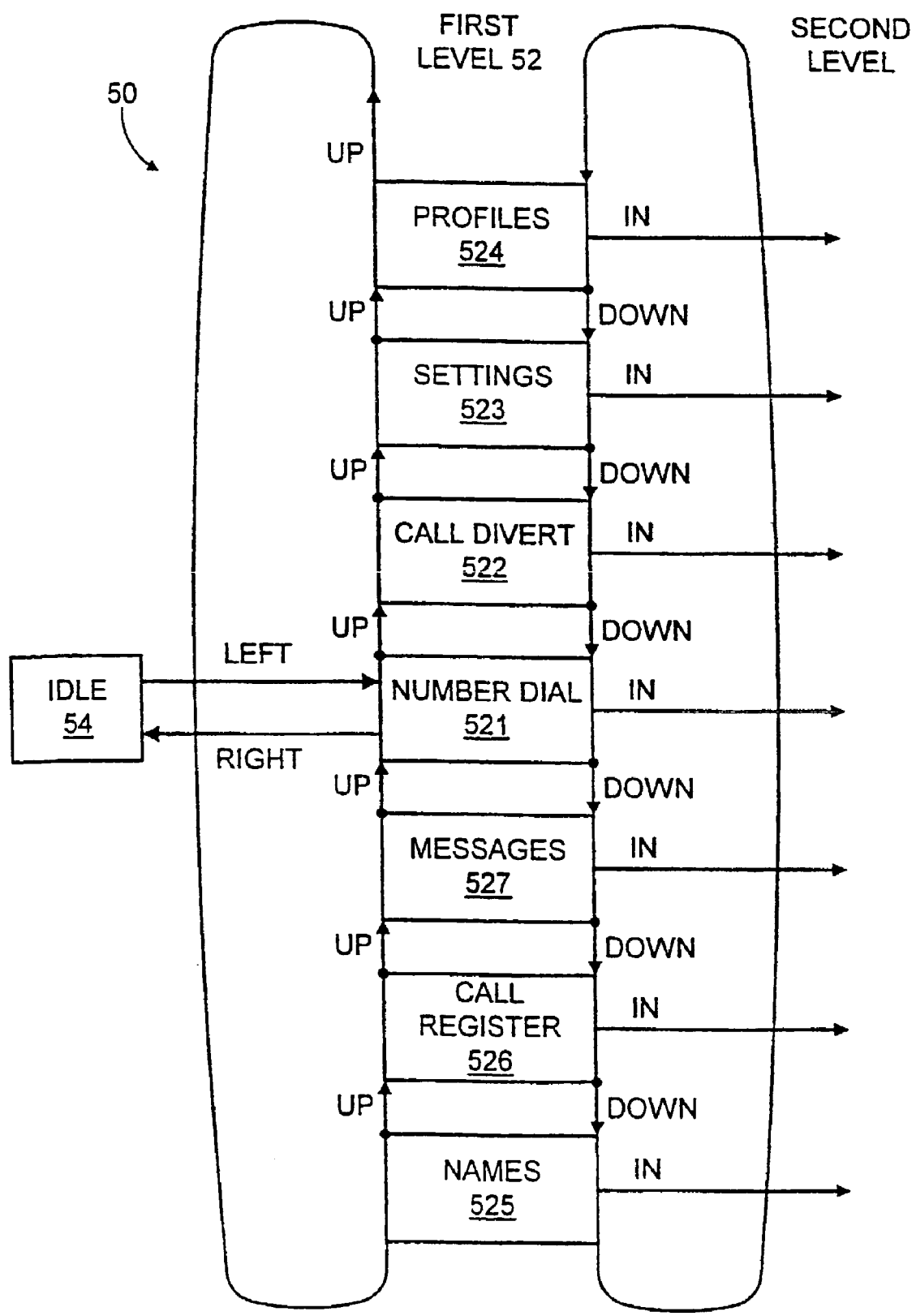
FIG. 5 illustrates the Menu structure in the phone.

FIG. 5 illustrates the layout of a Menu 50. When the phone is first switched on it enters the Idle state 54 in which it waits to receive a call or for user actuation. The joystick is in navigation mode. Pushing the joystick to the right enters the Menu 50. The Menu has on its first level 52 seven selectable items. These items are: Number Dial 521 which allows the user to input a number or select a number from memory for dialling; Call Divert 522 which includes options for diverting an incoming call to another number; Settings 523 which includes settings related to calls, phone and security; Profiles 524 which includes options for a user to customise the modes of phone use; Names 525 which is an editable phonebook from which calls can be made; Call Register 526 which includes a record of phone calls made; and Messages 528 which includes options for reading and composing text messages. The user can move from one item to an adjacent item by pushing the joystick up or down. The user can select an item and enter the second level 53 of the menu by pushing the joystick in. The user can return to the idle state from the first level 54 by pushing the joystick to the left.

The Menu items are the same as those in the NOKIA 6110 except that the joystick is used to navigate the Menu 100 and that due to the absence of an alphanumeric key keypad a new Number Dial item 521 is provided and new alphanumeric character entry methods are provided within each of the items where necessary.

In Idle mode the joystick has several pre-defined modes of operation. Pulling the joystick back causes the Names menu 525 to be displayed. Pressing the joystick inwards results in a shortcut to redial the last number dialled. Pressing the joystick inwards when an alphanumeric message is received causes the phone to display the Message "In Box" to read the message. Pressing the joystick inwards when an incoming call is received causes the incoming call to be answered.

The "text editing" mode of the joystick is active when alphanumeric character entry is required. In this mode the joystick operates in the same manner as an integrated cursor control device in the keyboard of a portable computer in that it controls the position of a cursor or similar selector on the display 26. The joystick can additionally be pressed to accept the selected character(s).

In "text editing" mode, a short press of the joystick to the left results in the deletion of the previous character. A long press to the left (1-2 seconds) causes the deletion of all the text entered so far. In this case the phone subsequently reverts to Idle mode.

A call may be made using the phone via the Names item 525, via Number Dial item 521 or via voice dial.

An incoming call may be answered, when the phone is in the closed configuration, by opening the cover. An incoming call may be answered when the phone is in the open configuration by pressing the joystick inwards. Closing the cover or by pressing the joystick inwards ends the call. When the cover is open, pushing the joy stick to the left rejects the call. The content of the display is the same when an incoming call is received irrespective of whether the cover is open or closed.

Turning now to the menu structure as shown in FIG. 5, further details of the menu structure will be described with reference to FIG. 6.

A mixed menu of characters and operands for functions of the phone, (e.g. to make a call) is used. In this case, the joystick is used to navigate to the Number Dial menu which is then selected by pushing the joystick inwards. A menu is displayed on the display and a user selects the numerical characters by pushing forward and pulling back the joystick as appropriate. Once the number input is complete, the user selects the Call operand item from the menu and the call is established.

Figure 6:
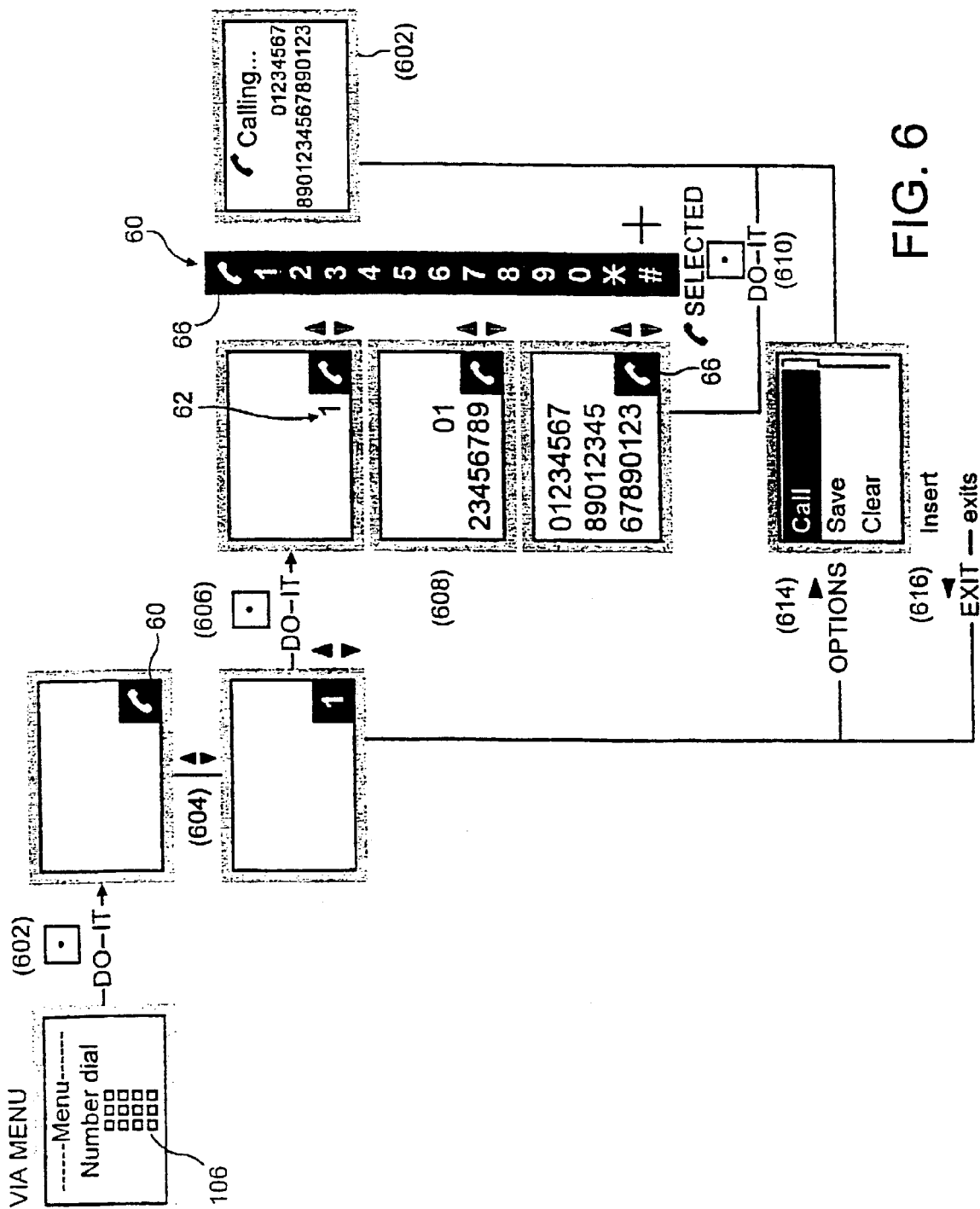
FIG. 6 illustrates a first method of data entry in accordance with the invention.

FIG. 6 shows the display 26 displaying the "Number Dial" menu item 521. In FIG. 6 a left arrow indicates that the joystick is pushed to the left, a right arrow indicates that the joystick is pushed to the right, an up arrow indicates that the joystick is pushed forward, a down arrow indicates that the joystick is pulled back and the symbol • indicates that the joystick is pushed inwards. A user selects the Number Dial option by pushing the joystick inwards (602) as described previously.

The display then changes to a text input mode with a menu 60 on the right-hand side of the display. The items of the menu 60 comprise both alphanumeric characters and operands, e.g. Call, OK, Name, Add etc. These operands can be represented textually or graphically as shown in FIG. 6. The icon 66 of a phone indicates the call operand. Thus a user can access the required functionality of the phone without having to move to a separate menu to carry out an action.

To select from the menu 60, a user scrolls through the menu (604) by pushing the joystick forward (if movement up the menu is required) or pulling the joystick back (if movement down the menu is required). Each item in the menu 60 is highlighted at the bottom right-hand corner of the display as the menu is scrolled. When the required alphanumeric character is highlighted, the user selects the character (606) by pushing the joystick inwards. The selected character 62 is then displayed on the left-hand side of the display 26, adjacent the menu 60. This action is repeated (608) until the text input is completed.

When the user has finished inputting the number, the user selects the phone icon 66 from the menu 60 by pushing the joystick inwards (610). The display 26 then changes (612) to indicate that this operand is being performed and the device proceeds to try to establish the call.

As described previously, pushing the joystick to the right at any time (614) causes the display of options available to the user at that time and pushing the joystick to the left at any time (616) causes the current menu to be exited.

Figure 7:
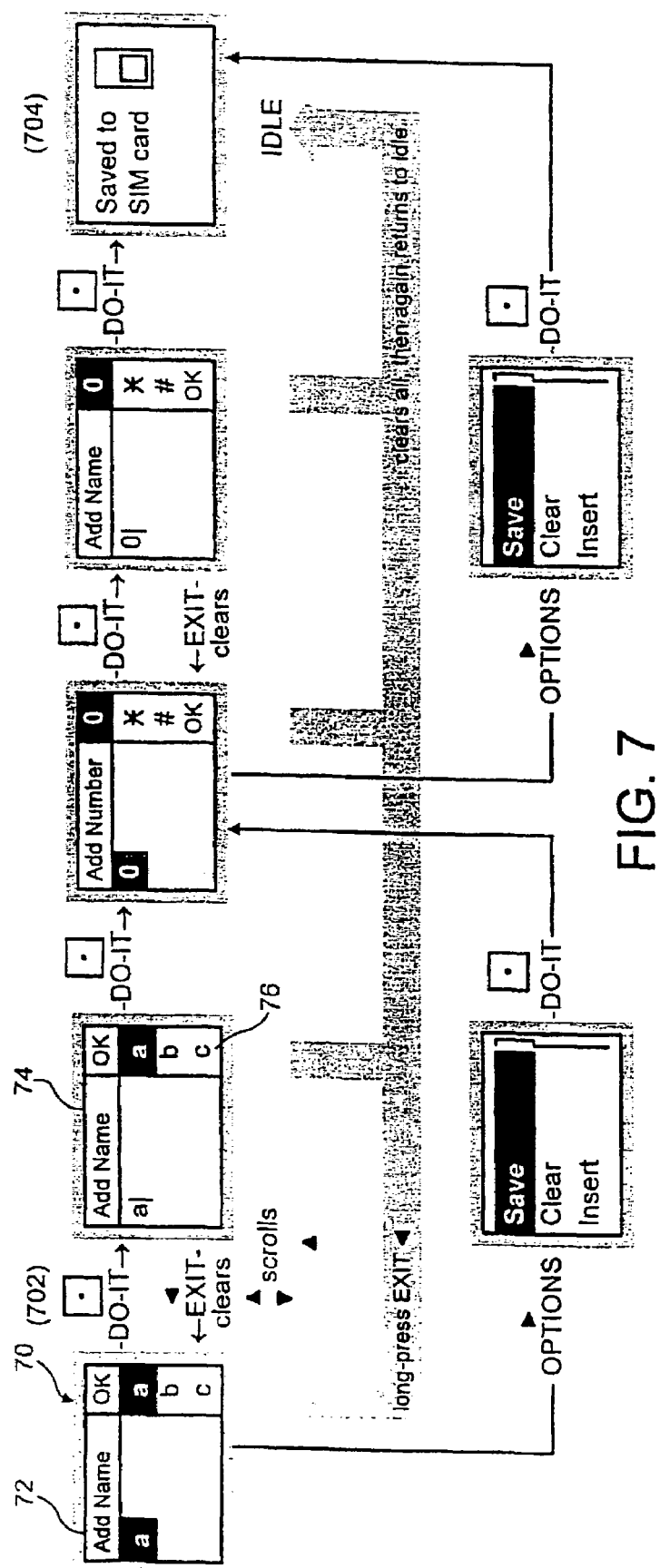
FIG. 7 illustrates a second method of data entry in accordance with the invention.

FIG. 7 shows the menus available when the Name menu 525 is selected. The user is presented with the "Add Name" option 72 and inputs a name using the alphanumeric characters in the menu 70. Again the items of the menu 70 comprise both alphanumeric characters and operands, e.g. OK, Caps (for capital letters), Insert, Exit etc. Once the name has been input, the user then selects from the menu 70 the required operand e.g. OK. When this operand is selected (702) the user is presented with the "Add Number" option 74 and a menu 76 of operands and numeric characters. Once the number to be associated with the name has been entered, the user selects the required operand from the menu 76 e.g. OK and the name and number are stored (704) in the memory 48 of the phone as a phone book entry. Suitable operands are OK, Insert and Cancel.

Alternatively the menus 60, 70, 76 may be provided at the bottom of the display in a horizontal manner. The menu items may be displayed a line at a time with an up/down movement of the joystick resulting in the display of successive lines of menu items and a left/right movement of the joystick resulting in the highlighting of successive items in the line of the menu 60.

Figure 8:
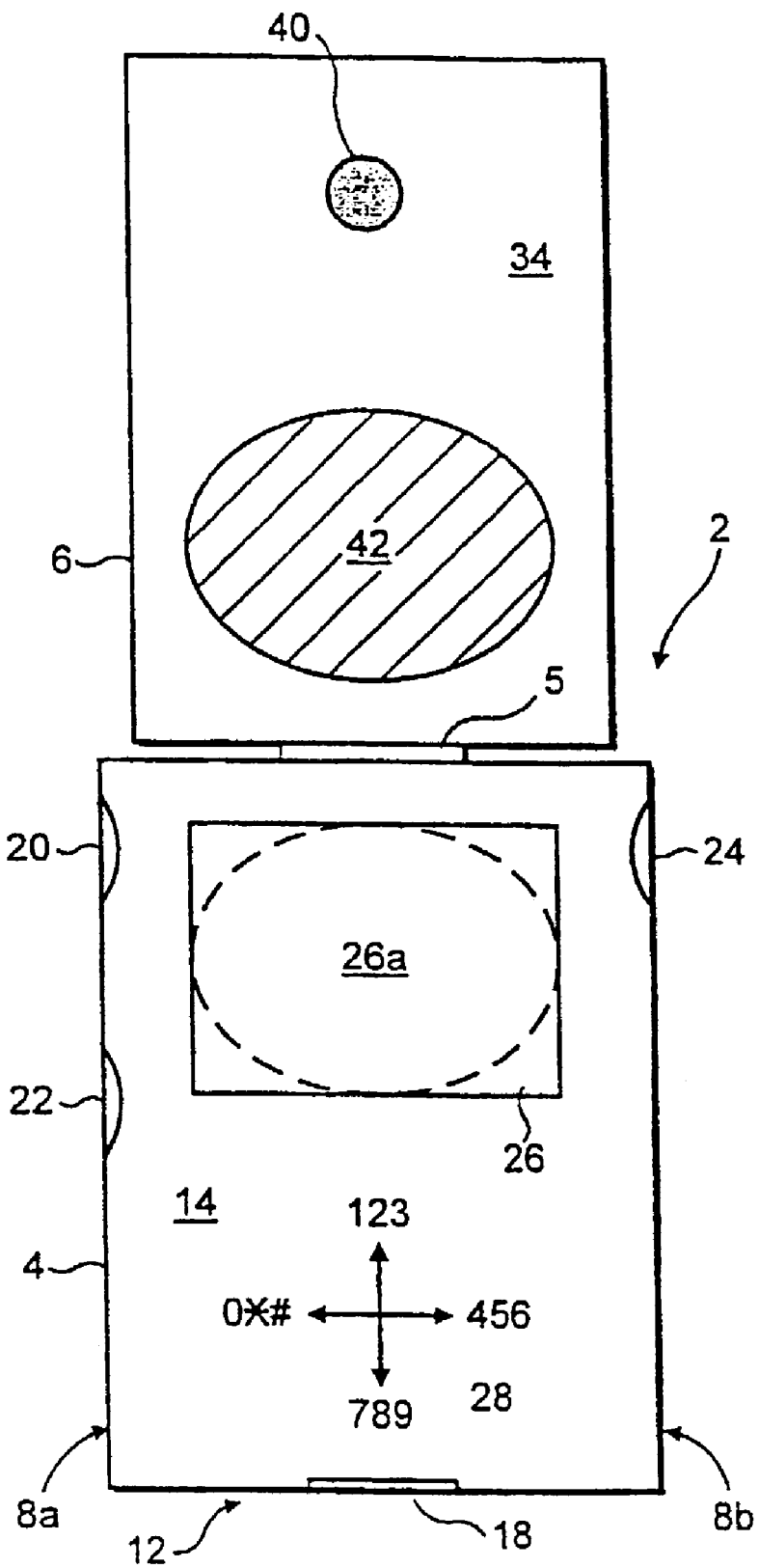
FIG. 8 is a front perspective view of the phone in an open configuration.

The joystick may also be used to input data directly, without the requirement for a menu of options to be displayed on the screen. For instance, the input device 28 may be used to input numeric characters. FIG. 8 shows an example of such a joystick. In FIG. 8, feedback to the user about the characters available is provided around the joystick, on the front face 14 of the body 4. Alternatively this feedback may be provided on the display 26.

Figure 9:
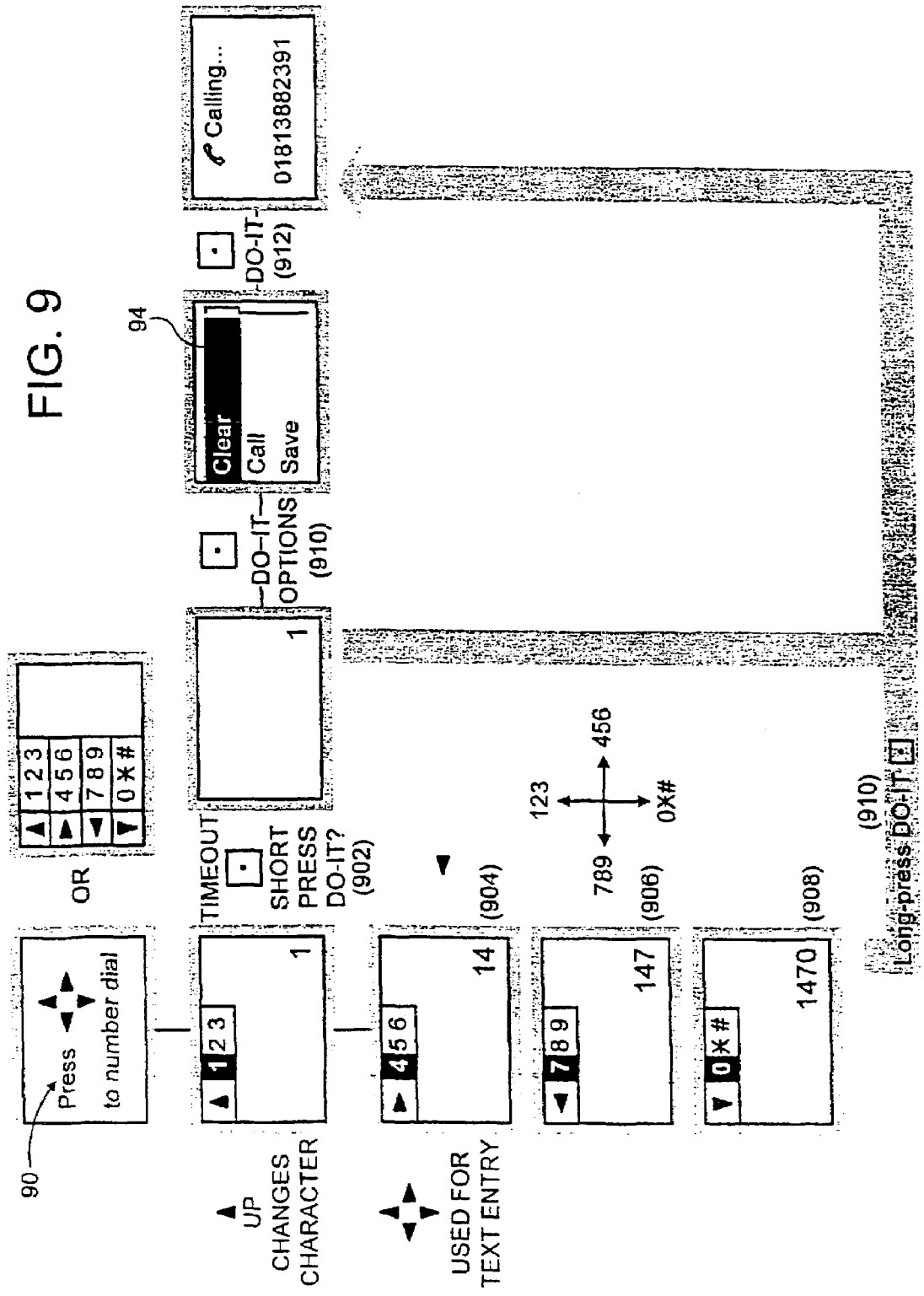
FIG. 9 illustrates a third method of data entry in accordance with the invention.

In this mode, a user is prompted to use the joystick to input numbers, for instance by an image 90 on the display 26 (see FIG. 9). If the user pushes the joystick forward the numbers 1, 2 or 3 may be selected; if the user pushes the joystick to the right the numbers 4, 5 or 6 may be selected; if the user pulls the joystick back the numbers 7, 8 or 9 may be selected; if the user pushes the joystick to the left the number 0 and the characters * and # may be selected.

Pushing the joystick repeatedly in one direction causes the characters available to be scrolled through; a character may be selected either if a pre-determined time has elapsed without any further input from a user or by the user pushing the joystick inwards (902) for a short time.

Once the user has input the number by successively pushing/pulling the joystick and then pushing the joystick inwards (904-908), the user pushes the joystick inwards for a relatively long time (e.g. 1-2 seconds) (910). This causes a menu 94 to be displayed. The user selects the appropriate action by pushing the joystick inwards (912) and the device carries out the action.

In a similar manner, the joystick may be used to input alpha characters. In this mode, a user is prompted to use the joystick to input alpha characters, for instance by an image on the display 26. If the user pushes the joystick forward the characters a, b, c, d, e, f, g may be selected; if the user pushes the joystick to the right the characters h, I, j, k, l, m may be selected; if the user pulls the joystick back the characters n, o, p, q, r, s, t may be selected; if the user pushes the joystick to the left the characters u, v, w, x, y, z and "space" be selected. Pushing the joystick repeatedly in one direction causes the characters available to be scrolled through; a character may be selected either if a predetermined time has elapsed without any further input from a user or by the user pushing the joystick inwards for a short time.

The device may be arranged to default to the mode of data input. Alternatively it may be a mode that is activated by the user selecting the option in the device's Profiles 524.

Figure 10:
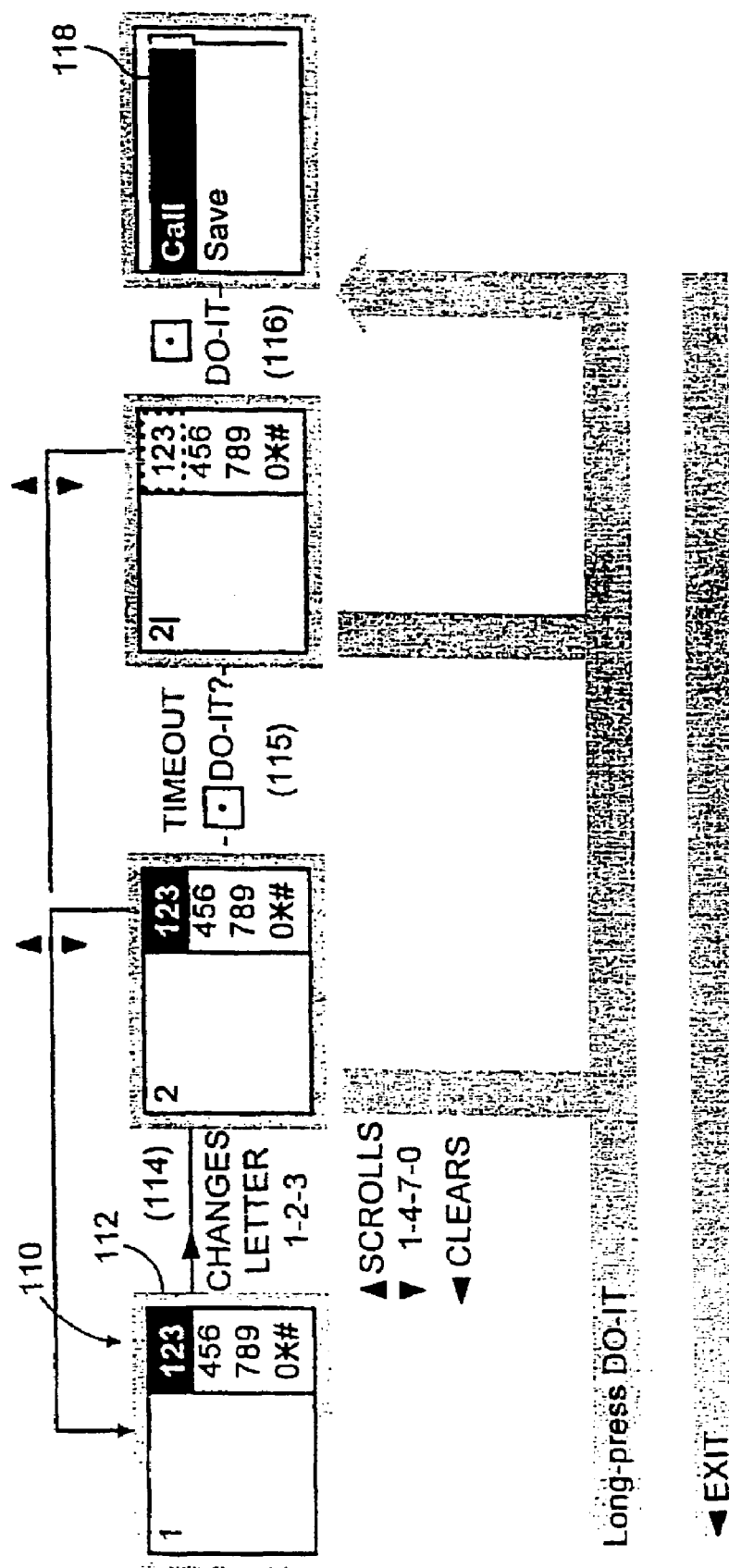
FIG. 10 illustrates a fourth method of data entry in accordance with the invention.

A further method of data input will now be described with reference to FIG. 10. A user scrolls through a list of characters 100 in blocks of three 102 by pushing the joystick forward or pulling the joystick back. The user selects a character by then pushing the joystick to the right (104) until the required character is highlighted and then pushing the joystick inwards (105) for a short time. When the user has inputted the entire item, the user pushes the joystick inwards (106) for a relatively long time. A menu 108 of actions is then displayed and the user selects the appropriate one by pushing the joystick inwards.

Figure 11:
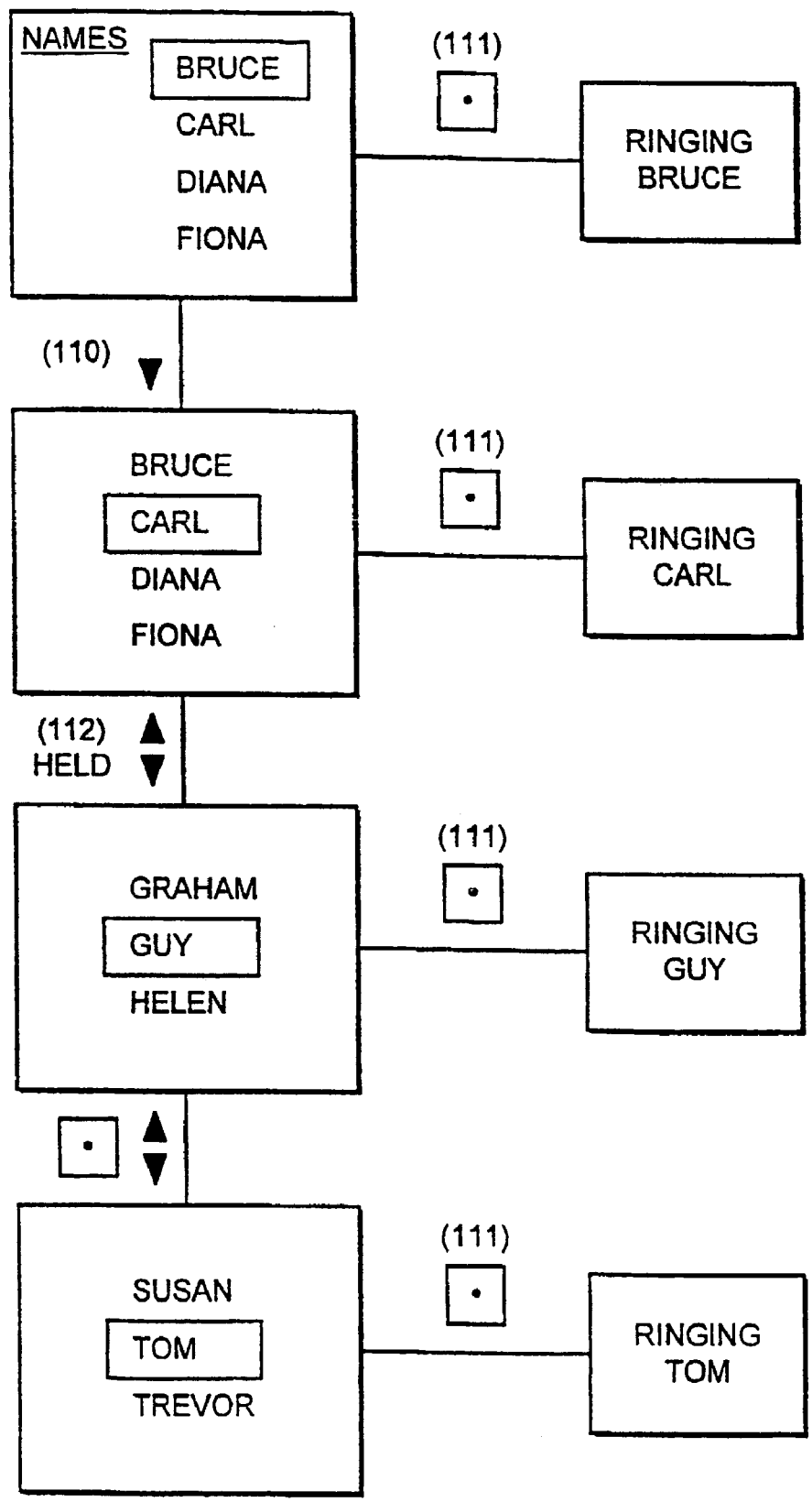
FIG. 11 illustrates a method of variable scrolling speed in accordance with the invention.

According to a further aspect of the invention, the speed of scrolling is determined by the position of the joystick as illustrated in FIG. 11. A selectable item is highlighted as the items in a menu are scrolled though. A single movement of the joystick up or down (110) causes a display (menu or text) to be scrolled through by one line at a time. Thus in FIG. 11 the highlighted item will change from Bruce to Carl. Pushing the joystick inwards (111) selects this item.

Moving the joystick up or down and holding it in this position (112) causes the item to be scrolled through continuously e.g the names Bruce, Carl, Diana, Fiona, . . . . Graham, Guy will be scrolled though in a continuous manner until the joystick is released. Pushing the joystick inwards (111) selects the highlighted item.

Moving the joystick up or down and holding it in this position whilst also pressing in on the joystick (113) results in a higher speed of continuous scrolling. Thus the display changes from Graham, Guy, Helen to further down the menu (e.g. Susa, Tom, Trevor) faster than previously. Thus a user can quickly scroll through a long list until the general region of the required item is located and then release the inward pressure on the joystick to cause the speed of scrolling to reduce. The joystick can then be held in the up (or down) position until the required item is located. The joystick is released and pushing the joystick inwards (111) then selects the highlighted item.

The hinge switch 30 is activated when the cover 6 is opened and is activated when the cover is closed. The switch detects when the interior surface 34 of the cover 6 makes a specific acute angle (for example 5 degrees) with the front face 14 of the body 4. The processor maintains a register which changes state when the hinge switch is activated. The processor is therefore aware of whether the cover is in the open or closed position. The processor also detects via the hinge switch 30 when the cover is opened and when the cover is closed.

Figure 12:
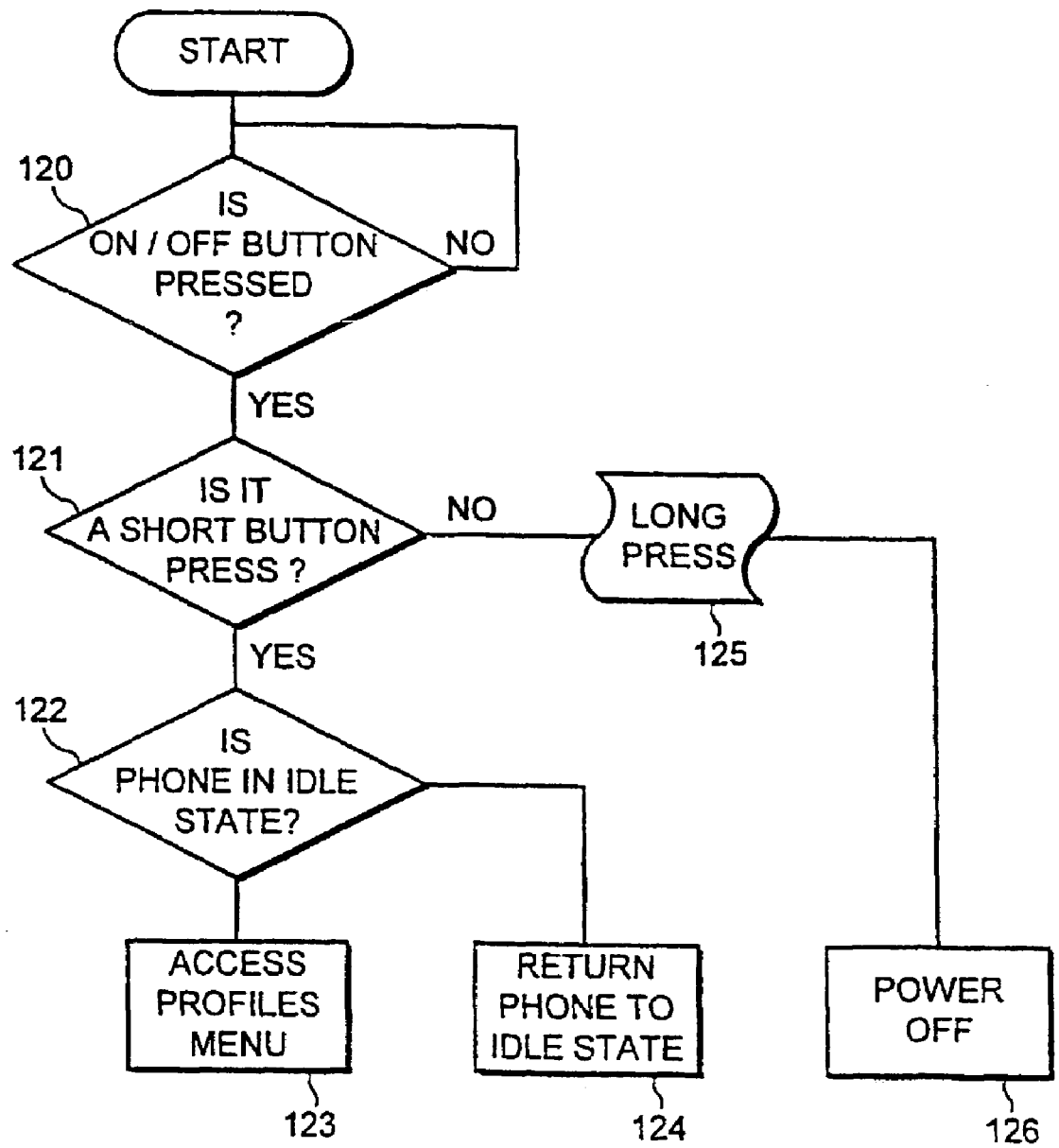
FIG. 12 is a flow chart illustrating the multiple functionality of an on/off switch of the phone.

Turning now to the on/off button 24 of the phone, illustrated in FIG. 3, this button has multiple functionality. In this embodiment, the functionality is determined by the manner of actuation of the button 24 and/or the state of the phone. FIG. 12 illustrates how the processor 50 determines which function to perform when the on/off button is actuated.

The processor waits for actuation of the on/off button 24 by the user (Step 120). When the button is actuated, the processor 50 proceeds to Step 121. In this case, the processor 50 responds differently when the button is depressed and released (short press) compared with when the button is held in a depressed position and then released (long press). The processor senses the input from the button. When the button is activated the processor starts a timer. When the button is deactivated the processor stops the timer. If the count of the timer is less than a predetermined threshold the processor determines that the user employed a short press and wishes to access a function or function associated with that method. Consequently, the processor moves to step 122.

Alternatively, if the count of the timer is equal to or more than a predetermined threshold (typically 1-2 seconds) the processor determines that the user employed a long press (Step 125). In this case, a long press is indicative of a power off function, and consequently, the processor performs this function in a conventional manner.

Turning back now to Step 122, the short press is not indicative of a single function. Instead, the function depends upon the state of the phone. If not in Idle mode 54 then the processor exits all menus and returns the phone to Idle mode 54 (Step 124). On the other hand, if the phone is already in Idle mode 54 then the processor performs a shortcut into the profiles menu (Step 123) which may also be entered via item 124. When in the Idle mode the on/off button has the same functionality as that in the NOKIA 6110 in the Idle mode.

The voice dial button 22 allows a user to dial a number using voice commands when the phone is in the Idle state.

In this embodiment, the display contains different information when in the idle state, depending on the circumstances of the phone. FIG. 13 illustrates different examples: FIG. 13 (*a*) shows different information presented on the display depending on whether the cover is in the open or closed position, and FIG. 13(*b*) shows alternative idle screens when the cover is in the closed position a headset is coupled to the phone.

FIG. 13(*a*) illustrates the idle screen as it appears on a visible area 131 of the display and on the whole display 132, when the cover is in the closed position. It also illustrates the screen as it appears on the display when the cover is in its open position.

As can be seen, when the cover is in the closed position, the content of the idle screen is reduced from that apparent when the cover is in its open position, to key information such as network signal strength, battery and time and this information is centred in the display. The format as opposed to the content is also changed. In the closed position the battery and signal indicators are of a rounded design extending towards the centre of the display, whereas in the open position they are of a linear design. The content of the screen is therefore more centred, simpler, clearer and contains less information when the cover is closed compared to when it is open.

FIG. 13(b) illustrates idle screens 134 and 135 as they appear on a visible area of the display when a headset is coupled to the phone. In this case, for an initial period, a first idle screen 134 is presented, that comprises the word "Headset" and icon of a headset. After this period, the processor controls the display to present a second idle screen 135 in which the word "Headset" is replaced with the time.

Idle mode screen may depend upon the placement or use of the product. For example, if the phone is a wrist-worn device its idle screen may have prominent watch functions such as time zones, alarms or analogue looking clock faces. Similarly, personalisable wearable products may have user defined bitmaps.

Easy access button 36 has multiple functionality when the phone is in the closed configuration and no function, it is disabled, when the cover is opened. In this context, multiple functionality does not mean that the button has multiple functions simultaneously, it does not. At any time, the button 36 has only a single function. However, that single function may be one of many depending upon the state of the phone. Generally, actuation of the button provides the most likely response to a given situation. It does not delete or change things. If the alarm rings, activation ends the ringing. If there is an incoming call activation mutes the ringing. If a message has just been received activation opens the message. If a call has just been missed activation gives the caller's details. If the phone is in the Idle state, activation redials the last dialled number.

Figure 15:
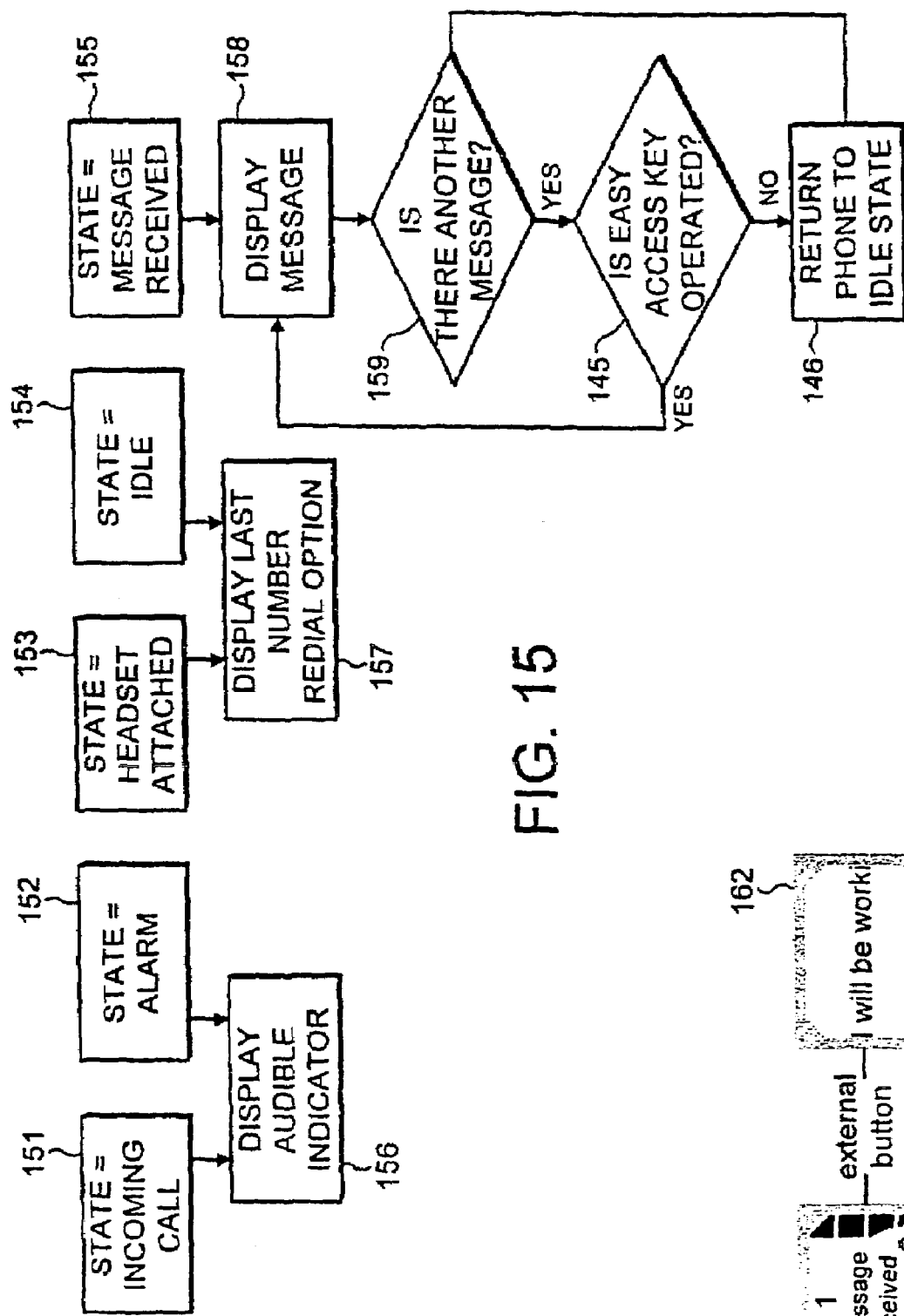

FIGS. 14 and 15 illustrate how the processor 50 determines which function to perform when the easy access button 36 is actuated.

Firstly, the processor 50 determines whether the phone's cover is in its closed position (Step 141). If it is, the processor waits for actuation of the easy access key by the user (Step 142). However, if the phone is in its open configuration, then the processor disables the easy access key (Step 144). This disablement may be complete or partial disablement of the phone. Complete disablement may, for example include the processor not responding at all to key actuation, so that even display backlighting, audible indications and the like, which generally occur upon key actuation, are not performed. Partial disablement, on the other hand, may merely be disablement of the actual function or functions associated with the key.

If the processor detects actuation of the easy access key, the processor proceeds from Step 142 to Step 143. Step 143 includes the determination by the processor of the state of the phone and the performance of the consequential function. This is further explained with reference to FIG. 15.

In this embodiment, the easy access key has a plurality of functions, depending upon the phone being in one of five states when the key is actuated. These five states are incoming call, alarm, headset attached, idle and message received, as explained briefly above.

If the processor 50 determines that, when the key is actuated, the phone is either in the incoming call state (decision 151) or the alarm state (decision 152), then the processor disables the audible indicator or speaker 38 (Step 156). Alternatively, if the processor 50 determines that, when the key is actuated, a headset is attached to the device (decision 153) or the phone is in the idle state (decision 151), then the processor accesses the last number redial menu. It also displays the last number redial option on the display 26.

The processor causes the received message to be displayed (Step 158) if the phone is in the message received state (decision 155) when the easy access key is actuated. Next, the processor determines whether the message displayed is the only one received. (Step 159). If it is, then once the message has been fully displayed, the processor returns the phone to its idle state (Step 146). However, if there is a further message, the processor waits for a further actuation of the easy access key (Step 145). If the key is not actuated within a predetermined period, then the processor returns the phone to its idle state (Step 146). However, on the other hand, if the key is actuated within the predetermined period, then the further message is displayed (Step 158). Steps 158, 159 and 145 are repeated until all messages have been displayed or the easy access key is not actuated within the predetermined period.

Figure 16:
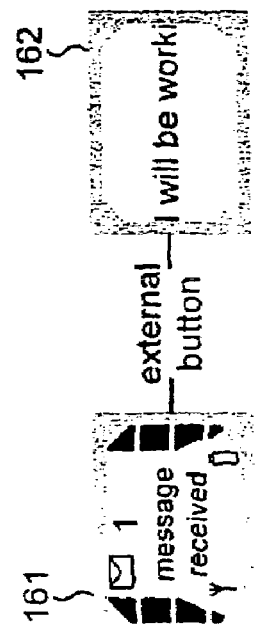
FIG. 16 illustrates various message screens.

FIG. 16 illustrates two message screens, as viewed when the cover is in its closed position. When a message is received, the state of the phone changes to the message received state. In response to this change, the processor causes the display to present the content as illustrated by the view 161. Then, once the easy access key (external button) is actuated, the message starts scrolling across the display, as illustrated by the view 162. In this embodiment, the information displayed contains the name or number of the message sender, followed by the message. Actuating the key again will cause the next message to be scrolled across the display, and so on. Once the last message has scrolled, a further actuation of the easy access key results in the phone returning to its idle state.

The procedure for dealing with a missed call or calls is similar to that for dealing with a received message or messages. When a call has been missed the caller details are stored in the phone's memory and the state of the phone changes to a missed call state. In response to this change the processor causes the display to present text indicating that a call or calls have been missed—e.g. "1 call missed", "2. calls missed" etc. Then, when the easy access key is actuated, the processor retrieves the caller's details from memory and provides them as text scrolling across the display. The callers details are also be displayed automatically if the cover is opened instead of pressing the easy access key. The details may be displayed in a static or scrolling format as described later for the display of text messages (FIG. 17b).

Some functionality associated with movement of the cover has already being described such as: answering an incoming call by opening the cover, ending a call in progress by closing the cover and the change in the content of the display when the phone is in the idle mode effected by opening and closing the cover. A further function associated with the active flip is when the phone is within an item of the menu, closing the flip will return the phone to the idle state. Opening the cover also has functionality in connection with reading received messages.

The process of accessing messages through the menu structure is illustrated in FIG. 17. Selecting Messages 528 from within the Menu 50 by scrolling up or down using the joystick and then pushing the joy stick inwards, displays all the messaging options 171: Inbox which stores received messages, Write which allows the composition of messages, Outbox which stores sent messages, Templates which stores pro-form messages or the like and Archive in which messages may be stored from the Inbox and Outbox. The icon next to In box contains an arrow indicating it contains a new (unread) message. Selecting the Inbox within the messaging options 171 by scrolling up or down if necessary to highlight "Inbox" and the then pressing the joystick in, displays the contents of the Inbox 172. The contents of the Inbox is a number of messages. The icon next to Colin indicates that this is an unread message. Selecting the message Colin from within the Inbox 172 by scrolling up or down as necessary using the joystick and then pushing the joystick in, displays the contents of the message 173. Pressing the joystick in again provides a number of options 174 such as erase, edit, archive etc. Selection of the appropriate item by scrolling using the joystick and then pushing the joystick in performs the appropriate function. In the example, erase is selected and the erase function performed. The display then returns to the Inbox 172 if there are any remaining unread messages or to the options 171 if there are not.

Figures 17A, 17B:
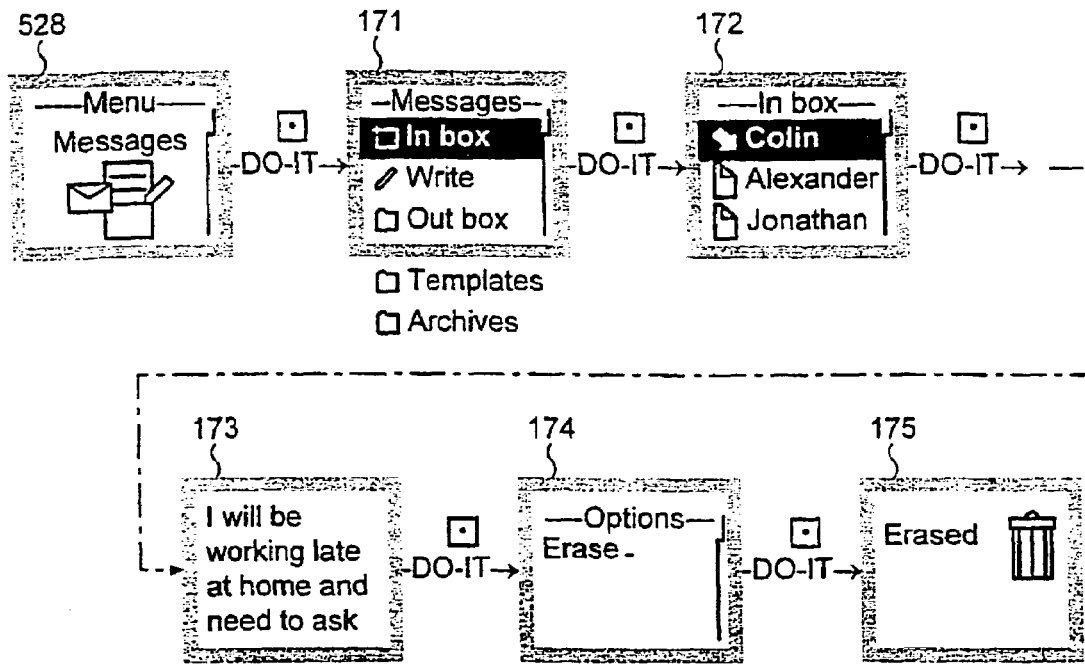
FIG. 17a illustrates how message functions can be accessed through the Menu 50.
FIG. 17b illustrates various formats that a displayed message or displayed caller details may take.

The format of the message displayed in 173 may take various forms as illustrated in FIG. 17*b*. The message may be static 176, with the user able to scroll up and down through the message by pushing the joystick up or pulling it down. The message may occupy several lines with it scrolling through the display word by word 177. For example, as a word disappears from the screen on the first line at the top left the whole message moves so that the next word is positioned at the top left hand corner of the display and one or more words are appear on the display at the bottom right hand corner. As another alternative 178 the message may occupy a single line and scroll across the screen one character at a time as if the display where a fixed window with the message passing by as if printed on a tape moving at a constant speed past that window.

When a message is received while the cover is open, the processor enters a message received state and the Idle display changes to indicate that a message has been received. This is illustrated as 180 in FIG. 18. Pushing the joystick inwards enters the Inbox 172. Pushing the joystick to the left, returns the display to the Idle mode. The up, down and right movements of the joystick have the same functions as in this received message state as in the Idle Mode.

When a message is received and the cover is closed there are two ways of accessing the message: pressing the easy access key and opening the cover. As previously described with reference to FIG. 16, when a message has been received with the phone in the closed configuration, and the easy access key (external button) is actuated, the content of the message is scrolled across the display portion as a single line one character at a time in a manner similar to that described in relation to format 178 of FIG. 17*b*. If the cover is then opened the format of the display changes. This is illustrated in FIG. 18*b*. The text no longer scrolls across the display in a single line, but is preferable displayed in a static format 176 or scrolling format 177 several lines at a time. If the message is displayed in a static format 176, it does not scroll automatically but the contents can be viewed by scrolling through the message using the joystick. Pushing the joy stick upwards scrolls upwards through the message. Pulling the joystick downwards scrolls downwards through the message.

When a message is received and the cover is closed, the phone enters a message received state 161 as illustrated in FIG. 16. If the cover is then opened, the phone then enters state 73 illustrated in FIG. 17*a* and displays the content of the message received. The format of the content may vary and may be static 176, multiple line and scrolling 177 or single line and scrolling as previously described with reference to FIG. 17*b*. This process is illustrated in FIG. 18*c*.

The voice dial button 22 allows a user to dial a number using voice commands when the phone is in the Idle state.

Although the user input device 28 has been described with reference to a joystick, the invention is also applicable to other user input devices e.g. a roller or rocker key that is moveable up, down, left, right and inwards.

The present invention may include any novel feature or combination of features described herein either explicitly or implicitly or any generalisation thereof whether or not it relates to the present claimed invention or mitigates any or all of the problems addressed. In view of the foregoing description it will be evident to a person skilled in the art that various modifications may be made within the scope of the invention.

What is claimed is:

1. A portable device comprising:
   a body;
   a cover having a closed position for at least partially covering the body and an open position;
   a processor;
   an audible indicator; and
   a key accessible when the cover is in the closed position, said key-being multifunctional,
   wherein the processor is configured to enter into a plurality of operational states including an incoming call state corresponding to the receipt of an incoming call and an idle state,
   wherein the function of the multifunctional key is dependent upon the operational state of the processor at the time that the multifunctional key is actuated,
   wherein actuation of the multifunctional key in a first manner when the processor is in the incoming call state causes the processor to mute the audible indicator without answering the call, and
   wherein actuation of the multifunctional key when the processor is in the idle state causes the processor to access a last number redial menu.

2. A portable device as claimed in claim 1, further comprising a receiver.

3. A portable device as claimed in claim 2, wherein the audible indicator is arranged to indicate an incoming call to the user when the device is in the incoming callstate.

4. A portable device as claimed in claim 1, further comprising:
   a display and wherein, for at least one state of the device, operation of the key controls the provision of information on the display.

5. A device as claimed in claim 4, wherein the display comprises a portion which is visible when the cover is in the closed position, and operation of the key controls the provision of information on the portion of the display visible when the cover is in the closed position.

6. A device as claimed in claim 2, further comprising:
   a display and wherein, for at least one state of the device, operation of the key controls the provision of information on the display,
   wherein, when the device is in a state corresponding to the receipt of a message, operation of the key controls the provision of information corresponding to the message.

7. A device as claimed in claim 4, wherein, when the device is in a state corresponding to the receipt of a missed call, operation of the key controls the provision of information corresponding to the missed call.

8. A device as claimed in claim 1, further comprising a transmitter.

9. A device as claimed in claim 4, further comprising:
   a transmitter,
   wherein, when the device is in the-idle state, operation of the key causes the processor to display a last number redial option on the display.

10. A device as claimed in claim 4, further comprising:
a transmitter,
wherein said device is arranged for coupling to a headset, and
wherein when the device is in a headset coupled state, operation of the key controls the provision of information corresponding to the last number dialed.

11. A device as claimed in claim 1, wherein operation of the key is a single actuation.

12. A portable device as claimed in claim 1, further comprising a receiver.

13. A portable device as claimed in claim 1, further comprising:
a display and wherein, for at least one state of the device, operation of the key controls the provision of information on the display.

14. A portable device as claimed in claim 2, further comprising:
a display and wherein, for at least one state of the device, operation of the key controls the provision of information on the display.

15. A portable device as claimed in claim 3, further comprising:
a display and wherein, for at least one state of the device, operation of the key controls the provision of information on the display.

16. A device as claimed in claim 3, further comprising:
a display and wherein, for at least one state of the device, operation of the key controls the provision of information on the display,
wherein, when the device is in a state corresponding to the receipt of a message, operation of the key controls the provision of information corresponding to the message.

17. A device as claimed in claim 2, wherein the display comprises a portion which is visible when the cover is in the closed position, and operation of the key controls the provision of information on the portion of the display visible when the cover is in the closed position.

18. A device as claimed in claim 3, wherein the display comprises a portion which is visible when the cover is in the closed position, and operation of the key controls the provision of information on the portion of the display visible when the cover is in the closed position.

19. A device as claimed in claim 5, wherein, when the device is in a state corresponding to the receipt of a missed call, operation of the key controls the provision of information corresponding to the missed call.

20. A device as claimed in claim 6 wherein, when the device is in a state corresponding to the receipt of a missed call, operation of the key controls the provision of information corresponding to the missed call.

21. A device as claimed in claim 2, further comprising a transmitter.

22. A device as claimed in claim 3, further comprising a transmitter.

23. A device as claimed in claim 4, further comprising a transmitter.

24. A device as claimed in claim 5, further comprising a transmitter.

25. A device as claimed in claim 6, further comprising a transmitter.

26. A device as claimed in claim 7, further comprising a transmitter.

27. A device as claimed in claim 5, further comprising:
a transmitter,
wherein when the device is in an idle state, operation of the key controls the provision of information corresponding to the last number dialed.

28. A device as claimed in claim 6, further comprising:
a transmitter,
wherein, when the device is in the idle state, operation of the key causes the processor to display a last number redial option on the display.

29. A device as claimed in claim 7, further comprising:
a transmitter,
wherein, when the device is in the idle state, operation of the key causes the processor to display a last number redial option on the display.

30. A device as claimed in claim 5, further comprising:
a transmitter,
wherein said device is arranged for coupling to a headset, and
wherein when the device is in a headset coupled state, operation of the key controls the provision of information corresponding to the last number dialed.

31. A device as claimed in claim 6, further comprising:
a transmitter,
wherein said device is arranged for coupling to a headset, and
wherein when the device is in a headset coupled state, operation of the key controls the provision of information corresponding to the last number dialed.

32. A device as claimed in claim 9, wherein said device is arranged for coupling to a headset, and
wherein when the device is in a headset coupled state, operation of the key controls the provision of information corresponding to the last number dialed.

33. A device as claimed in claim 2, wherein operation of the key is a single actuation.

34. A device as claimed in claim 3, wherein operation of the key is a single actuation.

35. A device as claimed in claim 4, wherein operation of the key is a single actuation.

36. A device as claimed in claim 5, wherein operation of the key is a single actuation.

37. A device as claimed in claim 6, wherein operation of the key is a single actuation.

38. A device as claimed in claim 7, wherein operation of the key is a single actuation.

39. A device as claimed in claim 8, wherein operation of the key is a single actuation.

40. A device as claimed in claim 9, wherein operation of the key is a single actuation.

41. A device as claimed in claim 10, wherein operation of the key is a single actuation.

42. A device as claimed in claim 1, wherein the multifunctional key is mounted on the cover of the device.

43. A device as claimed in claim 1, wherein for all states of the device, the multifunctional key has a single function, the single function changing with the state of the device.

44. A device as claimed in claim 1, wherein actuation of the multifunctional key provides the most likely response to a given situation.

45. A device as claimed in claim 1, wherein actuation of the multifunctional key does not effect deletion.

46. A device as claimed in claim 1, wherein the multifunctional key has multiple functionality when the cover is in the closed position, and wherein the processor disables the function of the multifunctional key when the cover is in the opened position.

47. A device as claimed in claim 1, wherein for at least the incoming call state, the multifunctional key has a single function.

48. A device as claimed in claim 1, comprising a plurality of keys accessible when the cover is in the closed position, wherein the multifunctional key is in a position remote from other of said keys.

* * * * *